2,795,619

HEXACHLORO-BICYCLO-HEPTENYL-VINYL ETHER

Arthur Goldman, Chicago, Ill., assignor to Velsicol Chemical Corporation, a corporation of Illinois No Drawing. Application February 14, 1955, Serial No. 488,129

1 Claim. (Cl. 260—611)

This invention relates to a new composition of matter useful in the production of unique polymeric resinous products.

More specifically, the present invention relates to the production of the compound (1,2,3,4,7,7-hexachlorobicyclo-[2.2.1]-2-heptenyl-5)-vinyl ether having the structure

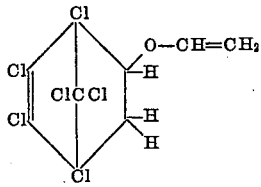

The reactivity of the present composition is unusual and unexpected. The monomeric divinyl ether from which the (1,2,3,4,7,7-hexachlorobicyclo-[2.2.1]-2-heptenyl-5)-vinyl ether is derived, as will hereinafter be more fully set forth, is an extremely reactive material. It polymerizes on standing at room temperature to form polymers and by this characteristic presents a stability problem during any protracted storage. The divinyl ether polymerizes even more rapidly under the influence of heat and pressure or with catalysts such as organic peroxides.

The monomer of the present invention is a novel halogenated vinyl, cycloalkenyl ether and has considerably more stability than the above described divinyl ether, being inert to spontaneous polymerization at room temperature or even at elevated temperatures. This product is further distinguished from the divinyl ether in that in spite of a reactive vinyl group it will not polymerize by peroxide catalysis under ordinary conditions.

The product of the present invention has utility as an intermediate in the preparation of unique resinous materials characterized by their resistance to heat and flame and fungus. These resins can be prepared by heating the aforementioned adduct in the presence of $BF_3$ catalyst. The resinous material thus produced forms excellent films suitable for coating metal surfaces and readily soluble in many common solvents to produce an organic material with broad protective coating application. In addition, adhesives and potting compounds can be made by controlling the extent of polymerization.

The above vinyl ether compound is prepared by the adduction of hexachlorocyclopentadiene and divinyl ether generally as follows:

The ratio of reactants, hexachlorocyclopentadiene and divinyl ether, is preferably equimolar, but if desired, a larger amount of either reactant can be used without detrimental effect. The reaction can be carried out at temperatures of from about 70° C. to about 150° C., and temperatures of from about 105° C. to about 135° C. are preferred. Pressure is not a critical factor in the present process and the reaction can be carried out in open vessels at atmospheric pressures if desired, but pressures slightly above atmospheric pressure are useful when operating at elevated temperatures and especially in the absence of solvents. While the reactants are liquids and mutually soluble, it is preferred to run the reaction in the presence of inert solvents, and especially at the more elevated temperatures whereby in the use of solvent pressure is unnecessary and the product formed contains a high percentage of the desired product. Solvents suitable for this reaction are inert hydrocarbon solvents such as alcohols, ketones, aromatic hydrocarbons such as benzene, toluene, xylene, and the like. The time necessary to complete the reaction may vary from 30 minutes to about 16 hours, while in the preferred range of temperature the reaction time best suited for high yields is from about 7 hours to about 10 hours.

The following example will specifically illustrate the preparation of (1,2,3,4,7,7-hexachlorobicyclo-[2.2.1]-2-heptenyl-5)-vinyl ether.

EXAMPLE I

Into a 500 ml. 3-necked flask equipped with stirrer, reflux condenser, thermometer, and addition funnel was placed hexachlorocyclopentadiene (137 g., 0.5 mol), isoamyl alcohol (100 ml.), and propylene oxide (3 ml.). The contents of the flask were raised to 120° C. and divinyl ether was slowly added to the reaction mixture below the surface of the liquid by the separatory funnel. The addition was controlled so as to add the stoichiometric amount of divinyl ether over about an 8-hour period. After addition was complete the reaction mixture was allowed to cool. Solid by-products were removed by filtration and the filtrate fractionally distilled under reduced pressure. The cut boiling at 93–105° C. at 0.3 mm. Hg pressure was recovered. On refractionation a material boiling at 79° C. and 0.8 mm. mercury pressure was recovered. This fraction was the desired product and had a refractive index of $n_D^{21}$ 1.5478 and elementary analysis as follows:

|  | C | H | Cl |
|---|---|---|---|
| Calculated for $C_9H_8OCl_6$ | 31.53 | 1.75 | 62.05 |
| Found for product | 31.35 | 1.77 | 62.39 |

The foregoing example is illustrative of a method of preparing (1,2,3,4,7,7-hexachlorobicyclo-[2.2.1]-2-heptenyl-5)-vinyl ether. Other conditions within the prescribed limits can also be used, such as, running the reaction in the absence of solvent.

As was previously indicated, the above compound is useful to prepare resinous materials. This product is especially unusual in that it will not, in spite of a reactive vinyl group, polymerize under the influence of an organic peroxide catalyst under ordinary conditions to form addition polymers. It has been found, however, that certain ionic catalysts of the Friedel-Crafts type such as $BF_3$ will cause polymerization and form interesting resinous materials. The following example will illustrate the homopolymerization of (1,2,3,4,7,7-hexachlorobicyclo-[2.2.1]-2-heptenyl-5)-vinyl ether with a $BF_3$ catalyst.

EXAMPLE II

*Formation of polymer*

To 25 grams of (1,2,3,4,7,7-hexachlorobicyclo-[2.2.1]-2-heptenyl-5)-vinyl ether in a glass reaction vessel was added about 1.0 ml. of 5% $BF_3$ solution in ether in a portionwise manner. The reaction mixture was kept at 70° C. during the addition which occurred over a period of about 7 hours. At the end of this time the contents of the flask had become extremely viscous even at 70° C. and had a pale yellow color.

On cooling, the reaction product become a tacky semisolid material with excellent adhesive qualities when applied to metals and other materials.

If desired, the monomeric vinyl material of the present invention can be copolymerized with other unsaturated materials using a Friedel-Crafts type catalyst, to secure new polymers with modified and unusual properties contributed by this new monomer. These other materials suitable for copolymers are unsaturated monomers such as styrene, vinyl acetate, divinyl benzene, cyclopentadiene, and the like. Catalysts which are useful for either homopolymerization and copolymerization are generally classed as Friedel-Crafts catalysts such as $BF_3$, $AlCl_3$, $ZnCl_2$, $SnCl_4$, $SbCl_3$, $HF$, $AlBr_3$, $ZnSO_4$ and the like.

Solvents may be used for the above polymerizations, but such solvents should be inert to the reactants. Ordinarily, when adhesives are desired, the polymerization is terminated before the maximum molecular weight is attained. At higher molecular weights polymers result which may be dissolved in various solvents to be used as coating materials for metals, and other items which require good adhesion. Excessive catalyst or high temperature causes darkening of the polymers and the production of brittle powder-like resins which are difficultly soluble even in aromatic hydrocarbons, and such excessive polymerization should be avoided, if possible.

I claim:

A compound of the structure

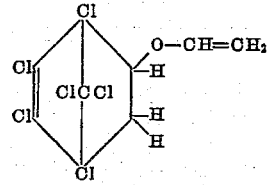

References Cited in the file of this patent

UNITED STATES PATENTS 2,415,453     Thomas _____ Feb. 11, 1947

OTHER REFERENCES

Prill: Jour. Am. Chem. Soc., vol. 69, p. 62, January 1947.